US007049979B2

(12) United States Patent
Dunning

(10) Patent No.: US 7,049,979 B2
(45) Date of Patent: May 23, 2006

(54) METHOD AND SYSTEM FOR PROJECTING DYNAMIC PARKING AVAILABILITY BASED ON AN ONGOING SURVEY FOR REMOTE LOTS WITH HIGH DEMAND

(76) Inventor: Anne E. Dunning, 855 W. Peachtree St. #1402, Atlanta, GA (US) 30301

( * ) Notice: Subject to any disclaimer, the term of this patent is extended or adjusted under 35 U.S.C. 154(b) by 261 days.

(21) Appl. No.: 10/637,532

(22) Filed: Aug. 11, 2003

(65) Prior Publication Data

US 2004/0032342 A1 Feb. 19, 2004

Related U.S. Application Data

(60) Provisional application No. 60/402,954, filed on Aug. 14, 2002.

(51) Int. Cl.
*B60G 1/48* (2006.01)

(52) U.S. Cl. ....................... 340/932.2; 340/933; 705/10

(58) Field of Classification Search .............. 340/932.2, 340/933, 908, 907, 539.28; 705/10, 13
See application file for complete search history.

(56) References Cited

U.S. PATENT DOCUMENTS 5,091,727 A 2/1992 Mahmood
5,432,508 A * 7/1995 Jackson .................. 340/932.2
5,748,107 A 5/1998 Kersken et al.
5,751,973 A * 5/1998 Hassett ....................... 705/13
5,877,704 A 3/1999 Yoshida
5,940,481 A * 8/1999 Zeitman ...................... 705/13
6,147,624 A 11/2000 Clapper
6,266,609 B1 * 7/2001 Fastenrath ................. 701/200
6,285,297 B1 9/2001 Ball
6,340,935 B1 * 1/2002 Hall ........................ 340/932.2
6,411,895 B1 6/2002 Lau et al.
6,426,708 B1 7/2002 Trajkovic et al.
6,771,185 B1 * 8/2004 Yoo et al. ............... 340/932.2
2001/0034642 A1 10/2001 Doner
2002/0029164 A1 3/2002 Sugar et al.
2002/0109611 A1 * 8/2002 Howard ................... 340/932.2
2003/0107498 A1 * 6/2003 Drennan ................ 340/825.28

FOREIGN PATENT DOCUMENTS

FR WO 98/49665 * 11/1998
JP 406088456 A * 3/1994

* cited by examiner

*Primary Examiner*—Daniel Wu
*Assistant Examiner*—Sihong Huang
(74) *Attorney, Agent, or Firm*—Clark & Brody

(57) ABSTRACT

A system forecasts parking availability for a time in the future based on driver-reported estimations of how long each vehicle in the parking area will stay and on forecasted arrivals. Current conditions in a parking area might misrepresent parking availability at the time when a driver will arrive. When accessing parking, drivers need a data input mechanism to report their expected stays, such as a smart ticket dispenser or parking meter. The data goes through a computer algorithm to forecast parking availability. This forecast can be communicated to remote parking access points.

14 Claims, 4 Drawing Sheets

METHOD AND SYSTEM FOR PROJECTING DYNAMIC PARKING AVAILABILITY BASED ON AN ONGOING SURVEY FOR REMOTE LOTS WITH HIGH DEMAND

This application claims priority under 35 USC 119(e) from provisional patent application 60/402,954 filed on Aug. 14, 2002 and incorporated in its entirety herein.

FIELD OF THE INVENTION

The present invention is directed to a method and system for forecasting parking availability, particularly in instances where a need exists to know well beforehand as to whether parking will be available.

BACKGROUND ART

The state of the art for intelligent transportation systems in parking calculates and communicates information on current availability of parking spaces and allows visitors approaching a lot to make a decision to enter the lot or to drive further to an overflow parking area. For remote lots with high demand, a driver must decide to attempt to park or to go elsewhere well in advance of arrival at the parking area, but parking availability can change between the time when the driver makes that decision and the time when the driver will arrive at the lot.

Therefore, a need exists to allow a driver to know well in advance of parking availability so that the driver can make an informed decision as to where to park. The present invention solves this need by providing a method which forecasts parking availability by accounting for vehicles already in the lot and for vehicles en route. In addition, the method includes forecasts of how long vehicles will stay parked in the lot.

SUMMARY OF THE INVENTION

It is a first object of the present invention to provide a method and system to forecast parking availability.

Another object of the invention is a method to forecast parking availability, which takes into account predictions of parking time.

One other object of the invention is a method of forecasting parking availability, which takes into account estimates of vehicle traffic en route to the parking area.

Yet another object of the invention is a system that allows for forecasting of parking availability using a parking lot entry device, other data and computing means.

Other objects and advantages of the present invention will become apparent as a description thereof proceeds.

Parking availability forecasts for a time in the future come from an ongoing automated survey to determine anticipated parking time, expected traffic arrivals, and algorithms applied to these data. Modifying the accepted concept of pushing a button to get a ticket from a dispenser to gain access to a parking lot, drivers entering a parking area can enter information (akin to pushing a button) that indicates how long they expect to stay parked there. Based on reported length of stay and vehicle estimates of traffic already en route, programmed algorithms can predict parking availability for the area at a time in the future, allowing drivers to make informed decisions whether to start the journey to the parking area or to look for another alternative.

The present invention is directed to, in one embodiment, a method of projecting parking availability for a parking lot of given capacity. Upon entry of a vehicle into the parking lot, information relating to a time of entry and an estimated length of stay of the vehicle is obtained, and an identifier such as a ticket is issued to the vehicle that is linked to the parking lot entry. An additional number of vehicles entering and staying in the parking lot based on a remote checkpoint that identifies the additional numbers of vehicles or historical data of vehicles entering the parking lot is also obtained. Space availability is projected in the parking lot using the information gathered from the number of vehicles that entered the lot and the estimated number of vehicles that will enter the lot. Once the space availability is projected, it can be provided to vehicles/drivers at one or more locations. At least one location should be remote from the parking lot entry so that alternative action can be taken if no parking availability exists. The remote location should be such that travel to the parking lot requires a significant amount of travel time from the location(s) where drivers must make a decision about parking there. A number of parking lots can be used to practice the method with the information regarding availability of parking in the number of parking lots being provided.

The historical data for use in estimating the additional number of vehicles arriving at the lot can include weather data to adjust lengths of stays in the lots. Information about vehicles exiting the lot can be used as part of the projection of parking availability.

The invention also entails a system for forecasting parking availability for a parking lot of given capacity. In one embodiment, the system comprises a parking lot entry device which is adapted to receive information relating to an estimated length of stay of a vehicle, associate a time of entry with said information, and an identifier issued to the vehicle that is linked to the parking lot entry. A parking lot exit device is also provide that is adapted to obtain information regarding vehicles leaving the parking lot. A database storing information received from the parking lot entry and exit devices, historical information of vehicle traffic to the parking lot over time, and optionally information from a remote checkpoint, which is adapted to receive information relating to a vehicle traveling to the parking lot and an estimated length of stay. Computing means is used to project availability of spaces in the parking lot based on information contained in the database. The projected parking space availability can be displayed in any number of locations and in any number of ways so that vehicle drivers can decide what to do.

The database can include weather data as part of the historical data and a plurality of parking lot entry and exit devices can be employed in connection with a plurality of parking lots.

The parking lot entry device can dispense a ticket and the ticket can be used in the parking lot exit device to indicate the identified vehicle has left the lot, negating its remaining forecast space occupancy. The parking lot exit device can include a manual input device for inputting information regarding entry into the parking lot if the dispensed ticket is lost.

DESCRIPTION OF THE PREFERRED EMBODIMENTS

The present invention offers significant improvements in the ability to forecast parking and allow drivers of vehicles to make decisions in advance based on parking availability.

The present invention is ideally suited for sites such as Glacier National Park in Montana. The heavily congested remote parking situation at Logan Pass Visitor Center in Glacier National Park provides a case for implementing the inventive method and system. Glacier National Park can use parking availability forecasts to provide advance information to visitors, so they can plan to take transit, visit other attractions, or expect to find private vehicle parking on the mountaintop.

The Logan Pass Visitor Center parking lot along the Going-to-the-Sun Road in Glacier National Park offers an extreme example of both remoteness and high demand. This visitor center stands high in the Rocky Mountains of northern Montana. The Going-to-the-Sun Road extends 50 miles across mountainous terrain and the Continental Divide. The Logan Pass Visitor Center marks the location of the Continental Divide, situated at milepost 28.6 in the middle of the road at an altitude of 6,646 feet. It takes approximately one hour to drive up to Logan Pass, depending on traffic and how many times a driver stops to enjoy scenery along the way.

Figure 1:
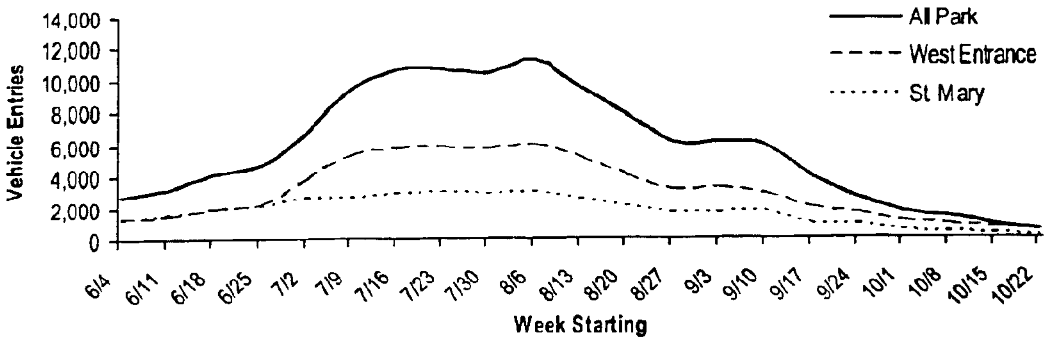
FIG. 1 is a graph depicting weekday seasonal visitation in terms of number of vehicles for weeks of a visiting season.
Figure 2:
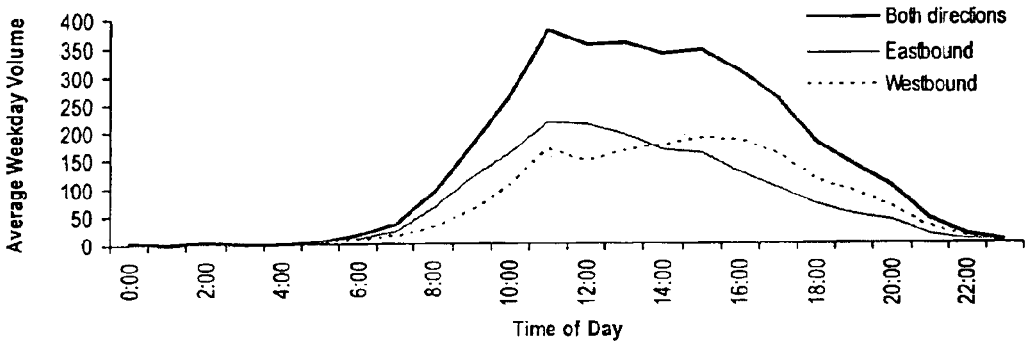
FIG. 2 is a graph depicting weekly volume of cars versus time of day.

According to the August 2000 Glacier National Park Survey of Visitors, 76% of all respondents went to Logan Pass on their visits, making it the most visited attraction for this major national park. Parking congestion persists perennially at peak visitor season and peak hours in the middle of the day. Though the park is open all year, the visitor season starts in earnest on the day when the park road crew finishes clearing winter snow from the Going-to-the-Sun Road (around June 15$^{th}$, on average) and lasts into October (see FIG. 1). Peak visitation occurs in July and August. At peak season, the two-lane 22-foot wide winding mountain road sees hourly traffic in excess of 250 vehicles per hour just west of Logan Pass between the hours of 10:00 am and 5:30 pm (see FIG. 2).

It would be ideal if the park could give visitors information about parking availability before they start their journeys, so they can decide whether to make the trip at another time, to engage in other activities, or to take their chances that they can find a space. The parking lot at Logan Pass contains 254 visitor spaces and eight bus spaces, motorcycles use a designated portion of the lot, and National Park Service vehicles typically park in a paved area that serves a truck for pumping sewage three times a day. Glacier's visitor survey showed that Logan Pass visitors stay parked in the lot for the durations indicated in the following Table.

TABLE

| Reported Duration of Logan Pass Parking | Percentage of Logan Pass Visitors |
|---|---|
| <15 min | 12% |
| 15 to 30 min | 24% |
| 30 min to 1 hour | 23% |
| 1 to 4 hours | 29% |
| 4 hours or more | 11% |
| Can't recall | 1% |

The durations vary because trip purposes vary. People can stop to use the bathroom, browse the bookstore, walk the short Hidden Lake Trail for a couple of hours, take the full-day Highline Trail, or embark on an overnight journey across the million acre park. During peak summer season in July and August, the Logan Pass parking lot stays full from mid morning until late afternoon. Visitors who have driven hundreds of miles to the park and an hour up the mountain to visit this mountain pass will often find themselves greeted by a ranger with an orange flag waving them to keep driving down the other side of the mountain, rather than inviting them to the visitor center. A simple tally of how many spaces are full will not indicate when they will empty; therefore, Glacier National Park cannot project whether someone at the base of the mountain at 3:00 will have a place to park when they reach the pass at 4:00.

Glacier National Park has considered several means of mitigating the parking problem at the pass. The National Park Service wants to avoid expanding the parking lot to avoid environmental impacts on a fragile tundra ecosystem; furthermore, the mountain has limited room for development. The terrain in this mountainous area precludes building substantial overflow lots. Local sentiment says a parking reservation system would impose too much structure and restriction on people visiting the park on vacation. Park management is considering expanding transit service. Currently, tour buses serve Logan Pass frequently during the day under reserved vacation packages. An infrequent hiker shuttle also runs up the mountain. Expanded service would offer shuttles every hour or half hour throughout the day. Even if transit service is expanded, parking at Logan Pass will continue to require attention. The park's 1999 General Management Plan explicitly guarantees private vehicle access on the Going-to-the-Sun Road.

While every engineer and planner wants to make transportation as painless as possible, the National Park Service must take one step further to make sure visitors enjoy the experience they get in parks. The charter for the National Park Service mandates that parks "conserve the scenery and the natural and historic objects and the wild life therein" and "provide for the enjoyment of the same in such manner and by such means as will leave them unimpaired for the enjoyment of future generations." The visitor experience should exclude long queues and denial of access to natural and historic resources. Along with providing an enjoyable transportation experience, park transportation planners must accommodate unique travel behavior. Whereas commuters at urban park and ride lots or travelers at airport lots typically rush to their destinations and leave their parking spaces as quickly as possible after accomplishing trip purposes, the National Park Service must plan on vacationers driving and parking in a less focused manner. For instance, trail hikers might return to their vehicle and eat sandwiches out of the trunk while admiring the surrounding scenery, chagrining parking space seekers. The visitor experience importantly includes allowing leisure and enjoyment while avoiding aggravation with transportation facilities and systems.

However, implementing intelligent transportation systems architecture in places such as Logan Pass are technologically challenging. The visitor center has no computing, no power, and no telephones. Wireless communications do not reach the mountaintop. Because the complete system will come later, implementation of parking information systems will need to occur in phases. In the first phase, the system must exist within the current context of this mountaintop parking lot's resources, which means no traditional power source and no communications wiring. The second phase will have the support of a complete information system infrastructure.

In a preferred embodiment, the parking area should have an entrance ticket dispenser, parking meters for spaces, or other device(s) that can receive data input and record or transmit that input for data analysis. The device(s) should show a screen or manual buttons akin to FIG. 3. Alternatively, traditional parking meter styles also allow input of time estimations, which can be recorded in a database under this system. Regardless of the metering device, when the driver selects a duration of stay, a computer can enter the information in a database to process how many spaces are full and how long they will be full for the present time.

While a ticket is used as part of identifying the vehicle entering the parking area, the method and system could operate by generating an identifier internally for use by the system for parking forecast, and without the need to issue an actual ticket. This identifier could be generated by the parking lot entry device in virtually any form that would allow recordation of information relating to the vehicle's entry into the parking lot, stored in the database, and used by the computing means for forecasting.

The system should be able to distinguish between visitor traffic using general spaces and other vehicles that should be excluded from demand calculations. Through this distinction, the algorithm will not close off visitor spaces for buses that use designated reserved spaces and National Park Service vehicles that park in a separate area. These vehicles should have transponders or pass cards to identify them, though it might be interesting to have them report expected stay, too.

Motorcycles and bicycles present another unique case because they use designated parking areas with no identified capacity problem. The current configuration of the entry to the Logan Pass lot has space to allow a motorcycle/bicycle bypass lane. Alternatively, these special cases can have a separate button on the ticket dispenser.

A computer can now process how many spaces are full and how long they will be full for the present time. As vehicles leave the lot, they must insert their tickets into another machine to remove their remaining estimated time. This information will lead to understanding the difference between a driver's expected stay and actual stay.

The system is intended to rely entirely on self-estimated parking durations.

- Software will use visitor reports as space reservations to calculate the number of spaces available at present and future times, based on vehicles in the lot at time=t+0 hours.
- An overnight stay indication will remove one space from lot availability permanently until that identified ticket is returned or an operator overrides the reservation.
- Historical traffic counts taken at Logan Pass will indicate expected daily traffic forecast to enter the lot for time=t+n hours by time of day for the corresponding time of season (Because parking capacity truncates measurement of how many people would enter the lot if they could, this system can neither measure nor accurately estimate unconstrained demand for parking at Logan Pass).
- Lengths of stay reported in the Visitor Use Survey (see the Table) applied to the expected number of vehicles entering the lot will set a distribution of durations of stay.
- A weighting factor can be used to skew the expected durations earlier in the day to last longer than the expected durations later in the day.
- Turning count studies will indicate how many vehicles will enter the lot from either side of the mountain at a given time of day. These numbers combined with simultaneous traffic counts taken at either side of the base of the mountain will indicate what percentage of low-elevation traffic will want to park when the vehicles reach the pass.
- Projections of what percentage of drivers at the base of the mountain will want to park when they reach the pass will come from data gathered in Phase I for the time of day:
  - Lower elevation vehicles at time=t+0 hours
  - Vehicles entering the Logan Pass parking lot at time=t+1 hours.

A preferred listing of system components is:

- A ticket dispenser robust enough to withstand
  - Routine 80 mile per hour winds and
  - Annual burial under snow (alternatively, park maintenance crews could remove the system seasonally)
- A ticket receiver
- Transponders for National Park Service vehicles and buses
- A computer with programming to make the dynamic analyses
- Satellite telephone data transfer estimated at four times per day to the Communications Center at park headquarters to indicate
  - When the lot is expected to fill
  - When the lot is full
  - When the lot is expected to come available
  - When the lot comes available
- Loop detectors
- Wiring for the local area system
- A solar power supply
- Static estimates of the number of vehicles that will drive up the mountain by time of day and day of season, based on historical data Other architecture for the park should include power and communications wiring to the top of the mountain.

Additional components could include:

- Loop detectors at lower elevations on either side of the mountain with actual dynamic counts of the number of vehicles heading up the mountain
- Dynamic estimates of the distribution of how long those vehicles will park at Logan Pass
- Variable message signs at the base of the mountain to indicate projected parking availability in one hour
- A live data link to the Communications Center in park headquarters to show detailed current and projected availability For implementation in environmentally-sensitive areas, all components should blend into the natural environment as much as possible. Equipment that meets visitor eyes (the ticket dispenser, the ticket receiver, and gates) should meet National Park Service standards for aesthetic quality.

Figure 3:
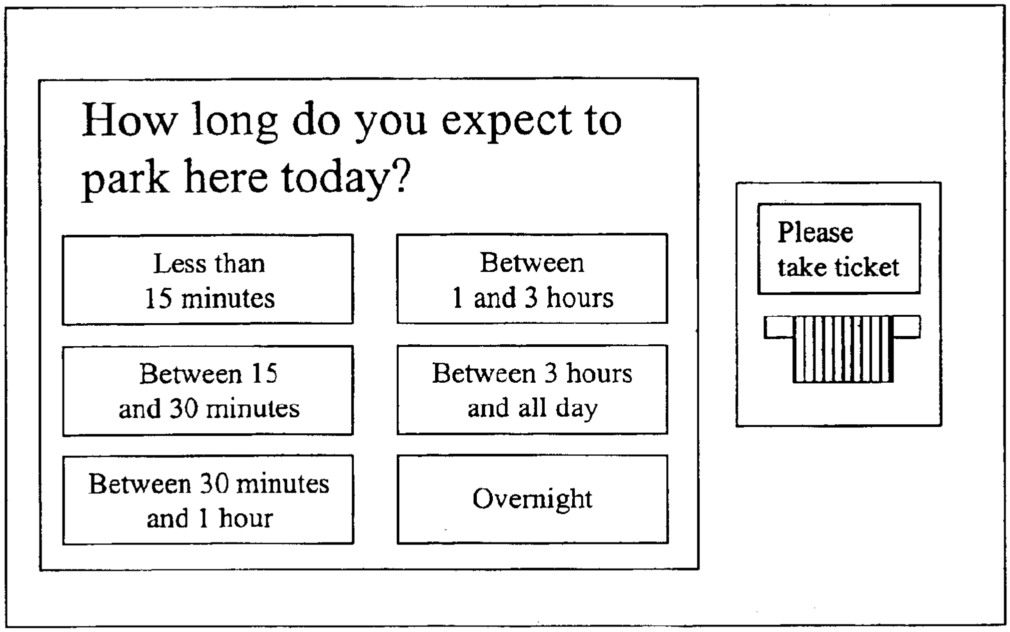
FIG. 3 shows an exemplary entrance ticket dispenser of the inventive system.
Figure 4:
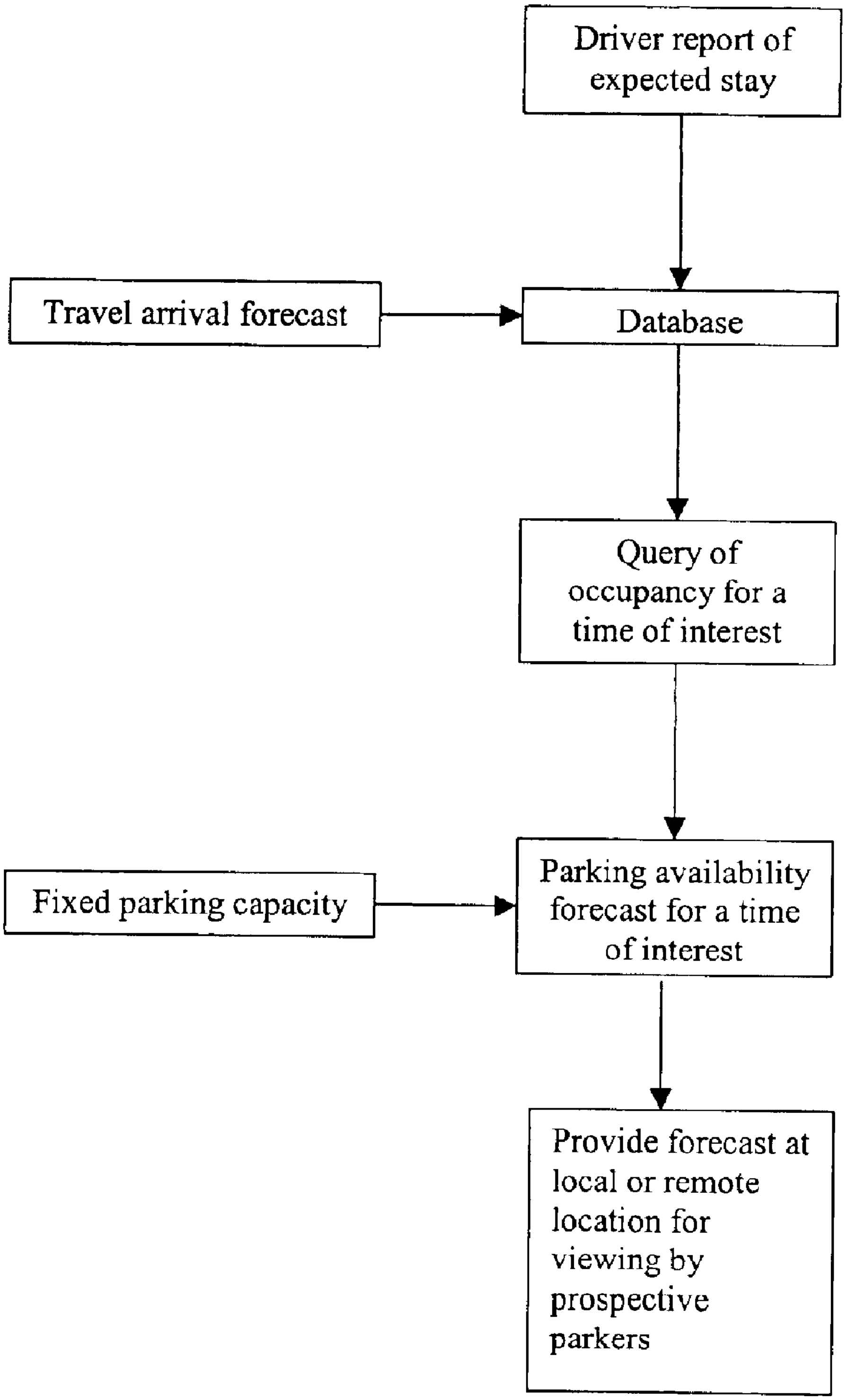
FIG. 4 is a flow chart showing the steps for achieving the parking forecast.

Referring to FIGS. 3 and 4, as a foundation, the database of the system will include at least three fields: the vehicle identifier (ID), the time of entry into the lot (ENTRY), and the duration of stay in the lot (STAY). These individual vehicle variables combine with the fixed information of the capacity of the lot to provide information on space availability in the lot.

Data collection and manipulation using a computing means will follow the procedure depicted in FIG. 4. The computing means is not depicted but it would be any computer capable of storing the information and processing the information using the guidelines disclosed below. The variables of interest for system algorithms are:

ID Vehicle identifier
ENTRY Time of entry
STAY Duration of stay in the lot (reported or assumed)
TIME Time of inquiry into lot usage
TAKEN Parking spaces taken at the time of inquiry
CAPACITY Parking lot capacity
AVAIL Parking spaces available at the time of inquiry For vehicles that have arrived at the lot, actual time of arrival (ENTRY) and the intended stay reported by the driver (STAY) will be entered into the database for analysis as:

ENTRY=actual time of entry

STAY=driver-reported value of stay duration

An assumption needs to be made for vehicles arriving at the lot after the current time but before the time of interest in lot use. This assumption could come from vehicles passing a checkpoint, in which case:

ENTRY=current time+travel time

STAY=expected value of stay duration

The assumption might also come from historical data, in which case times of entry and expected stay would be entered based on computations and analysis.

From the database or spreadsheet, a query such as the following structured query language (SQL) query will determine the number of vehicles forecast to be in the parking area at the time of inquiry.

select COUNT(ID)

from DATABASE where ENTRY≦TIME and (ENTRY+STAY)≧TIME);

Based on this query, the number of ID's that are estimated to be in the lot at the time of inquiry equals the number of spaces taken at that time:

COUNT(ID)=TAKEN

Parking availability for the time of inquiry can then be calculated as:

AVAIL=CAPACITY−TAKEN

The parking availability can be provided to interested parties in any number of ways. Road signs remote from the parking lot can display forecasts. The information can also be obtained by persons accessing the Internet, receiving a fax, listening to radio reports, by dialing a traffic information phone number, or other means.

Figure 5:
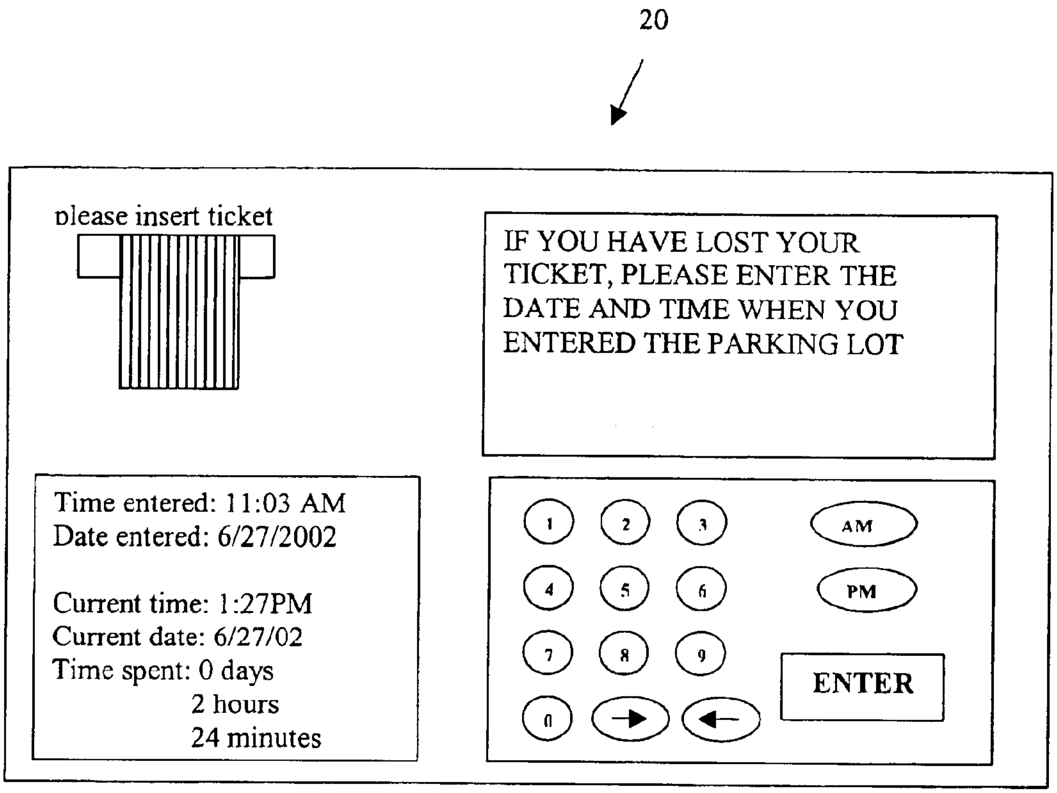
FIG. 5 shows an exemplary exit ticket receptacle

As vehicles leave the parking lot, the tickets dispensed upon entry are used for exit. The tickets would be inserted into a device 20 such as shown in FIG. 5. This identifier linked to a vehicle and its reported stay allows for adjustment of the remaining time if the vehicle leaves earlier than anticipated. Recording this information also allows understanding of the difference between a driver's expected stay and the actual stay.

If someone loses the ticket, the device 20 allows the vehicle to leave the parking lot. A visitor can input the time and date of entry into the parking lot. Either a computer or a person can deduce which vehicle has a matching profile and has not exited. The system can then re-list that parking space as available and update the availability forecast. The manual override step should be slightly less convenient than insertion of the ticket so that the visitor will prefer to use the ticket to exit rather than go through the manual override process.

The inventive method can function based on just the input information obtained when a visitor enters the parking lot and the estimate of duration and/or historical data or other correction factors, if used. For example, it could be assumed that all cars will leave the lot after the expected stay has expired, thus no exit information is required.

Weather can also be used as a factor in the dynamic projections of parking demand and availability. As noted above, calculations of expected stays based on visitor reporting can include a correction factor based on actual data gathered. Weather data can also be factored in to provide another correction factor. For example, days that are cold, windy and rainy will cause visitors to leave the parking lot prematurely, and estimated lengths of stay by visitors could be reduced.

It should be understood that the algorithms defined above are one way in which to achieve the parking forecast. Other algorithms as could be developed by those of the skill of the art in light of the disclosure are also within the scope of the invention.

The ongoing survey system builds on the premise that as long as drivers push a button on a ticket dispenser to gain access to parking, that button might as well have meaning. Parking managers will gain an understanding of current parking availability and expected parking availability based on reported estimated stay. Drivers can use the information to make more informed decisions on whether to pursue parking in the monitored area or find an alternative.

The concept of dynamic parking availability forecasting can be expanded beyond the simple example of a single lot. Metropolitan area transportation centers can consider implementing availability forecasts for wide-ranging information systems applications. Lots reporting parking availability can send the information to a central system to disseminate information on availability at a time and place.

Parking meters, where people are already accustomed to placing money on their estimates of parking durations, offer a logical extension of this idea. Communications from meters can indicate when paid time will expire, thus when each space will come free. Analysts can collect the information centrally and communicate information on where a group of spaces offers parking potential, so drivers can avoid cruising for parking and creating the associated traffic congestion and air quality implications.

In all situations, dynamic parking availability forecasts based on user reporting offer a way to reduce driver frustration and to mitigate traffic congestion. Empowering people with this information before they start their trips will lead to more informed transportation decisions. In turn, this new capability will reduce the burden on parking operators and managers to appease insatiate parking demand.

This system will require initial investment for equipment and programming, but it should incur only minimal operating costs for future years of service. This system should not substantially lengthen the time it takes to enter the lot because the survey is limited to one question. Whereas this system holds the disadvantage of adding gates to free parking lots, such as Logan Pass in Glacier National Park, dynamic parking availability projections offer a number of benefits. In the immediate implementation, a site where the system is implemented will gain an understanding of:

Current parking availability

Expected parking availability based on reported estimated stay

The difference between a driver's expected stay and actual stay

The distribution of expected and actual stay by time of day and day of season

When drivers receive the results of this information and analysis, they can make informed trip plans. In the Logan Pass case, giving visitors the knowledge they need to make these decisions in advance will empower them to control how they spend their vacation time, thereby improving their visitor experience. Some drivers will likely game the system; however, rangers monitoring the parking lot at Logan Pass should encounter fewer irate visitors because the people who find a full lot will have known what odds they were trying to beat.

Beyond the realm of Glacier National Park and parking on Logan Pass, this dynamic availability information system has further implications for:

Other national parks and state and places with attractions and parking in remote areas Airport parking lots where people should be directed in advance to overflow lots Park and ride lots where people would want to know from the highway if they should bother taking an exit Web site advance information that might affect mode choice according to parking availability across the city Other situations where drivers need to know well in advance of their arrival at a parking lot whether the lot will be open when they get there Metropolitan area transportation centers can consider implementing availability forecasts for wide-ranging information systems applications. Lots reporting parking availability can send the information to a central system to disseminate GIS maps pinpointing availability at a time and place. This information can be transmitted to in-vehicle maps, public information variable message signs (ideally with graphics), websites, and other media.

For urban parking metering systems, short distance wireless transmitters can communicate from meter to meter when each space will come free, and analysts can collect the information centrally. Traffic count figures should temper availability estimates. For instance, locations with 15-minute maximum stay meters will always look like they will have perfect availability within a quarter hour, but congested streets indicate that those spaces will disappear quickly. With weighted availability estimates, transportation analysts can communicate information on where a group of spaces offers parking potential, so drivers can avoid cruising for parking and creating traffic congestion and auto emissions.

As such, an invention has been disclosed in terms of preferred embodiments thereof, which fulfills each and every one of the objects of the present invention as set forth above and provides a new and improved method for forecasting parking lot availability.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of forecasting parking availability for a parking lot of given capacity comprising the steps of:

a) upon a vehicle entering the parking lot, providing information relating to an estimated length of stay of the vehicle, associating a time of entry with said information, and issuing an identifier to the vehicle that is linked to the parking lot entry;

b) forecasting an additional number of vehicles entering and staying in the parking lot based on a remote checkpoint that identifies the additional numbers of vehicles or historical data of vehicles entering the parking lot;

c) forecasting space availability in the parking lot using the information gathered from the number of vehicles that entered the lot and the forecasted number of vehicles that will enter the lot;

d) providing the projected space availability to vehicles at one or more locations, at least one location remote from the parking lot entry so that alternative action can be taken if no parking availability exists.

2. The method of claim 1, wherein traveling to the parking lot from the remote location requires a significant amount of travel time from the location(s) where drivers must make a decision about parking there.

3. The method of claim 1, wherein historical data based on a number of cars visiting a site being served by the parking lot is used as part of step (b).

4. The method of claim 1, wherein the information of step (a) is gathered from a number of parking lots, and information regarding availability of parking in the number of parking lots is provided.

5. The method of claim 1, wherein the identifier includes a ticket adapted to be dispensed to a vehicle user.

6. The method of claim 1, wherein the historical data includes weather data.

7. The method of claim 1, wherein information about vehicles exiting the lot is used as part of the step (c).

8. A system for projecting parking availability for a parking lot of given capacity comprising:

a) a parking area entry device which is adapted to receive information relating to an estimated length of stay of a vehicle, associate a time of entry with said information, and generate an identifier related to the vehicle that is linked to the parking area entry;

b) a database storing information received from the parking area entry device either historical information of vehicle traffic to the parking lot over time or information from a remote checkpoint which is adapted to receive information relating to a vehicle traveling to the parking lot and an estimated length of stay, or both;

c) computing means for projecting availability of spaces in the parking lot based on database information; and d) means for communicating the projected parking space availability at least in a location remote from the parking lot.

9. The system of claim 8, wherein the database includes weather data as part of the historical data.

10. The system of claim 8, further comprising a plurality of parking lot entry devices located in a plurality of parking lots.

11. The system of claim 8, wherein the parking lot entry device dispenses a ticket as part of the identifier.

12. The system of claim 8, further comprising a parking lot exit device used to obtain actual time of departure for the space reservation associated with the identifier's record, such that the exit data will update the database by the computing means.

13. The system of claim 12, wherein the parking lot exit device includes a manual input device for inputting information regarding entry into the parking area.

14. The system of claim 8, wherein communication of the parking availability occurs on one or more of a road sign, a handheld or desktop electronic device, in-vehicle devices, a wireless or non-wireless communication device, radio, telephone, and printed material.

* * * * *